(12) United States Patent
Yang

(10) Patent No.: US 11,523,879 B2
(45) Date of Patent: Dec. 13, 2022

(54) HANDLE SYSTEMS AND METHODS FOR ENDODONTIC TOOLS

(71) Applicant: Quanzu Yang, Burnaby (CA)

(72) Inventor: Quanzu Yang, Burnaby (CA)

(73) Assignee: INNOVATIVE BIOCERAMIX INC, Burnaby (CA)

(*) Notice: Subject to any disclaimer, the term of this patent is extended or adjusted under 35 U.S.C. 154(b) by 179 days.

(21) Appl. No.: 17/148,001

(22) Filed: Jan. 13, 2021

(65) Prior Publication Data

US 2021/0212798 A1 Jul. 15, 2021

Related U.S. Application Data

(60) Provisional application No. 62/995,075, filed on Jan. 13, 2020.

(51) Int. Cl.
| | |
|---|---|
| *A61C 1/18* | (2006.01) |
| *A61C 1/14* | (2006.01) |
| *A61C 5/42* | (2017.01) |
| *A61C 1/12* | (2006.01) |
| *A61C 1/10* | (2006.01) |

(52) U.S. Cl.
CPC .............. *A61C 1/185* (2013.01); *A61C 1/144* (2013.01); *A61C 1/10* (2013.01); *A61C 1/12* (2013.01); *A61C 5/42* (2017.02)

(58) Field of Classification Search
CPC .......... A61C 1/185; A61C 1/144; A61C 1/10; A61C 1/12; A61C 5/42

USPC .......................................................... 433/114
See application file for complete search history.

(56) References Cited

U.S. PATENT DOCUMENTS

| | | | | |
|---|---|---|---|---|
| 5,040,978 A | * | 8/1991 | Falcon ................. | A61C 17/005 |
| | | | | 433/125 |
| 5,902,107 A | * | 5/1999 | Lowell ..................... | A61C 1/12 |
| | | | | 433/125 |
| 9,259,292 B1 | * | 2/2016 | Stango ...................... | A61C 1/12 |
| 2017/0281311 A1 | * | 10/2017 | Aloise ................ | A61B 17/1617 |
| 2018/0185127 A1 | * | 7/2018 | Mansour .............. | A61C 17/005 |
| 2019/0191969 A1 | * | 6/2019 | Geldrich ................ | A61B 1/247 |
| 2019/0270187 A1 | * | 9/2019 | Chiang .............. | B25B 23/0028 |
| 2021/0212798 A1 | * | 7/2021 | Yang ...................... | A61C 1/185 |

* cited by examiner

*Primary Examiner* — Matthew M Nelson
(74) *Attorney, Agent, or Firm* — Schacht Law Office, Inc.; Michael R. Schacht

(57) ABSTRACT

A handle system for supporting a tool defining a tool axis during the performance of dental procedures comprises a handle defining a handle axis, a rotation sleeve, a head assembly and a gear set comprising first and second gear portions. The rotation sleeve supports the first gear portion. The head assembly supports the second gear portion. The handle supports the rotation sleeve for rotation relative to the handle. The handle supports the head assembly such that the first gear portion engages the second gear portion. With the head assembly supported by the handle, the head assembly engages the tool to support the tool such that the tool axis extends at a first angle relative to the handle axis and rotation of the rotation sleeve relative to the handle causes axial rotation of the tool about the tool axis.

20 Claims, 9 Drawing Sheets

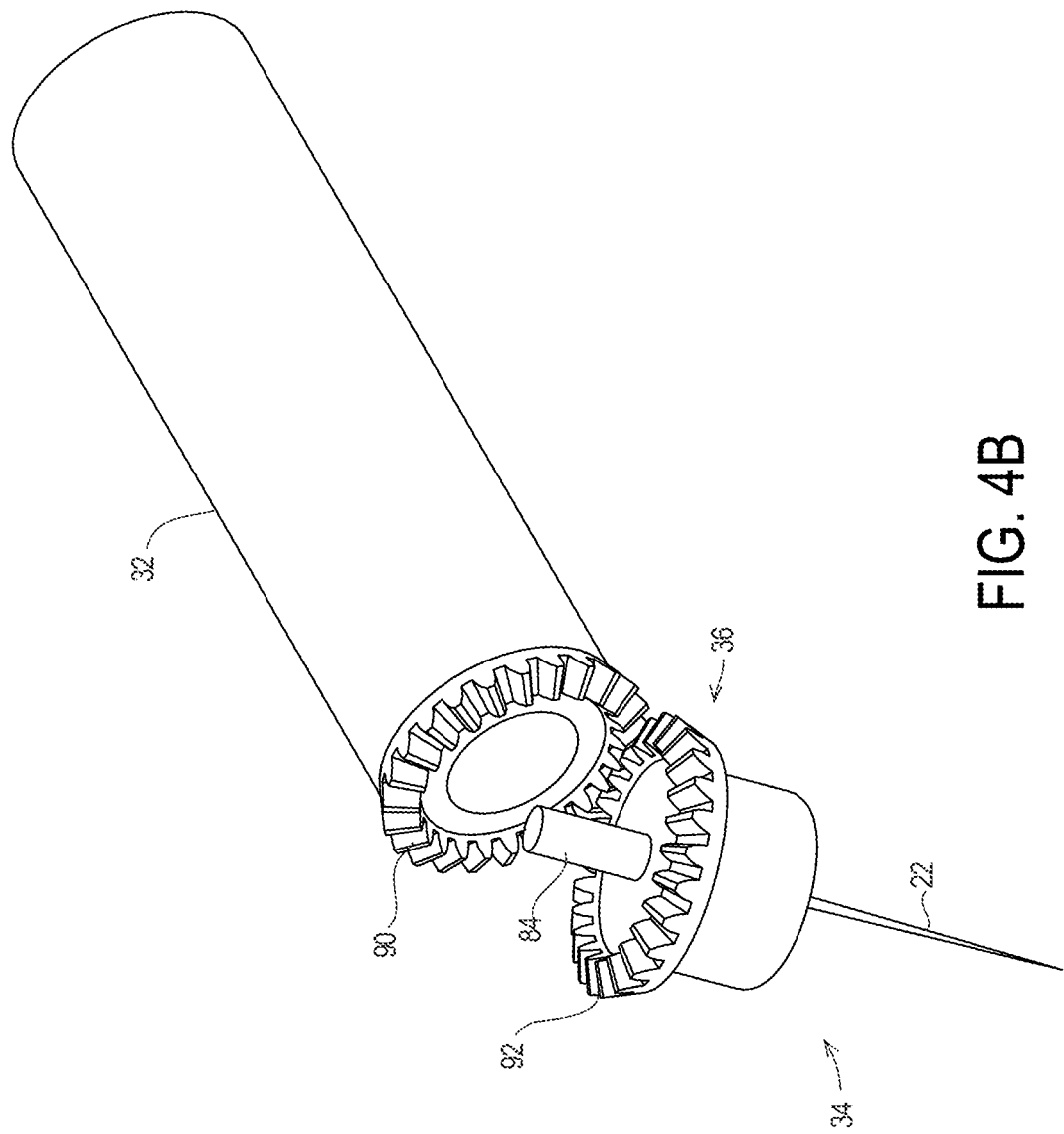

HANDLE SYSTEMS AND METHODS FOR ENDODONTIC TOOLS

RELATED APPLICATIONS

This application claims benefit of U.S. Provisional Application Ser. No. 62/995,075 filed Jan. 13, 2020, the contents of which are incorporated herein by reference.

TECHNICAL FIELD

The present invention relates to endodontic systems and methods and, in particular, to handles systems and methods that facilitate the handling of tools used when performing endodontic or other dental procedures.

BACKGROUND

Endodontic tools such as files and reamers are surgical instruments used by dentists when performing root canal treatment. These tools are used to clean and shape the root canal, with the concept being to perform complete chemomechanical debridement of the root canal to the length of the apical foramen. Preparing the canal in this way facilitates the chemical disinfection to a satisfactory length but also provides a shape conducive to obturation (filling of the canal).

Martin (EP0351486A1) discloses a root canal instrument handle. The handle of Martin is relatively small and thus difficult for dentists to grip when accessing the root canal during difficult cases. Further, the handle of Martin provides reduced visibility and increases fatigue when used to prepare the canal.

The need thus exists for improved handle systems and methods for supporting endodontic tools while performing endodontic procedures such as root canal treatment.

SUMMARY

The present invention disclosed a novel design of handle for endodontic files that may be manually operated to drive endodontic file rotation and axial reciprocation simultaneously.

The invention may be embodied as a handle system for supporting a tool defining a tool axis during the performance of dental procedures that comprises a handle defining a handle axis, a rotation sleeve, a head assembly and a gear set comprising first and second gear portions. The rotation sleeve supports the first gear portion. The head assembly supports the second gear portion. The handle supports the rotation sleeve for rotation relative to the handle. The handle supports the head assembly such that the first gear portion engages the second gear portion. With the head assembly supported by the handle, the head assembly engages the tool to support the tool such that the tool axis extends at a first angle relative to the handle axis and rotation of the rotation sleeve relative to the handle causes axial rotation of the tool about the tool axis.

The present invention may be embodied as a handle system for supporting a tool defining a tool axis during the performance of dental procedures comprising a handle, a rotation sleeve, and a head assembly. The handle defines a handle axis and comprises a first handle portion defining a first connection portion and a second handle portion defining a second connection portion. The first connection portion engages the second connection portion to detachably attach the first handle portion to the second handle portion. The rotation sleeve comprises a first gear portion. The head assembly comprises a tool mounting system and a second gear portion. The handle supports the rotation sleeve for rotation relative to the handle and the head assembly such that the first gear portion engages the second gear portion. With the head assembly supported by the handle, the head assembly engages the tool to support the tool such that the tool axis extends at a first angle relative to the handle axis and rotation of the rotation sleeve relative to the handle causes axial rotation of the tool about the tool axis.

The present invention may also be embodied as a method of supporting a tool defining a tool axis during the performance of dental procedures comprising the following steps. A handle defining a handle axis, a rotation sleeve, and a head assembly are provided. A first gear portion is supported on the rotation sleeve. A second gear portion is supported on the head assembly. The rotation sleeve is supported on the handle such that the rotation sleeve may rotate relative to the handle. The head assembly is supported on the handle such that the first gear portion engages the second gear portion. The head assembly is operated to engage the tool to support the tool such that the tool axis extends at a first angle relative to the handle axis. The rotation sleeve is rotated relative to the handle to cause axial rotation of the tool about the tool axis.

BRIEF DESCRIPTION OF THE DRAWINGS

FIGS. 4A and 4B depict an example gear set that may form a part of an example handle system of the present invention;

DETAILED DESCRIPTION

A handle system of present invention may take a number of different forms, and several examples of handle systems for supporting endodontic tools will be described below.

I. First Example Handle System

Figure 1A:
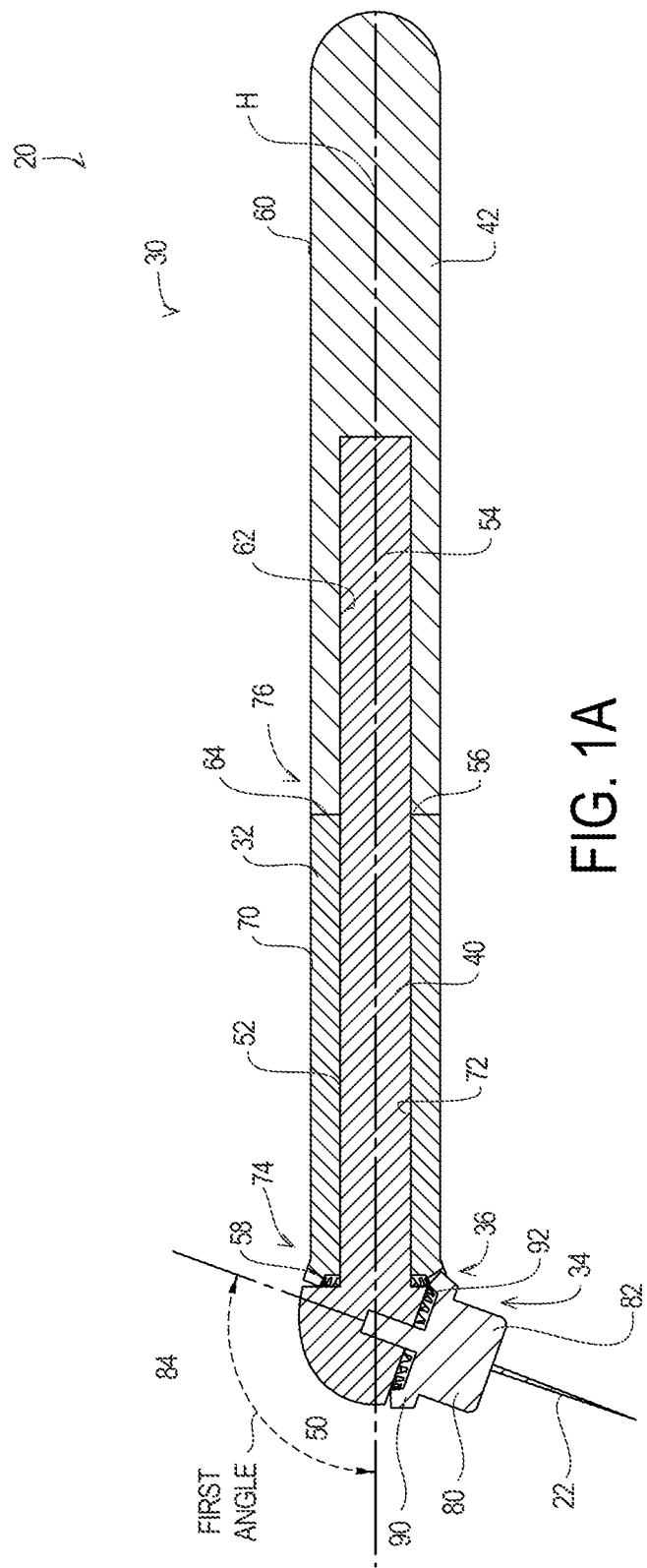
FIG. 1A is a side elevation, section view of a first example handle system of the present invention.
Figure 1B:
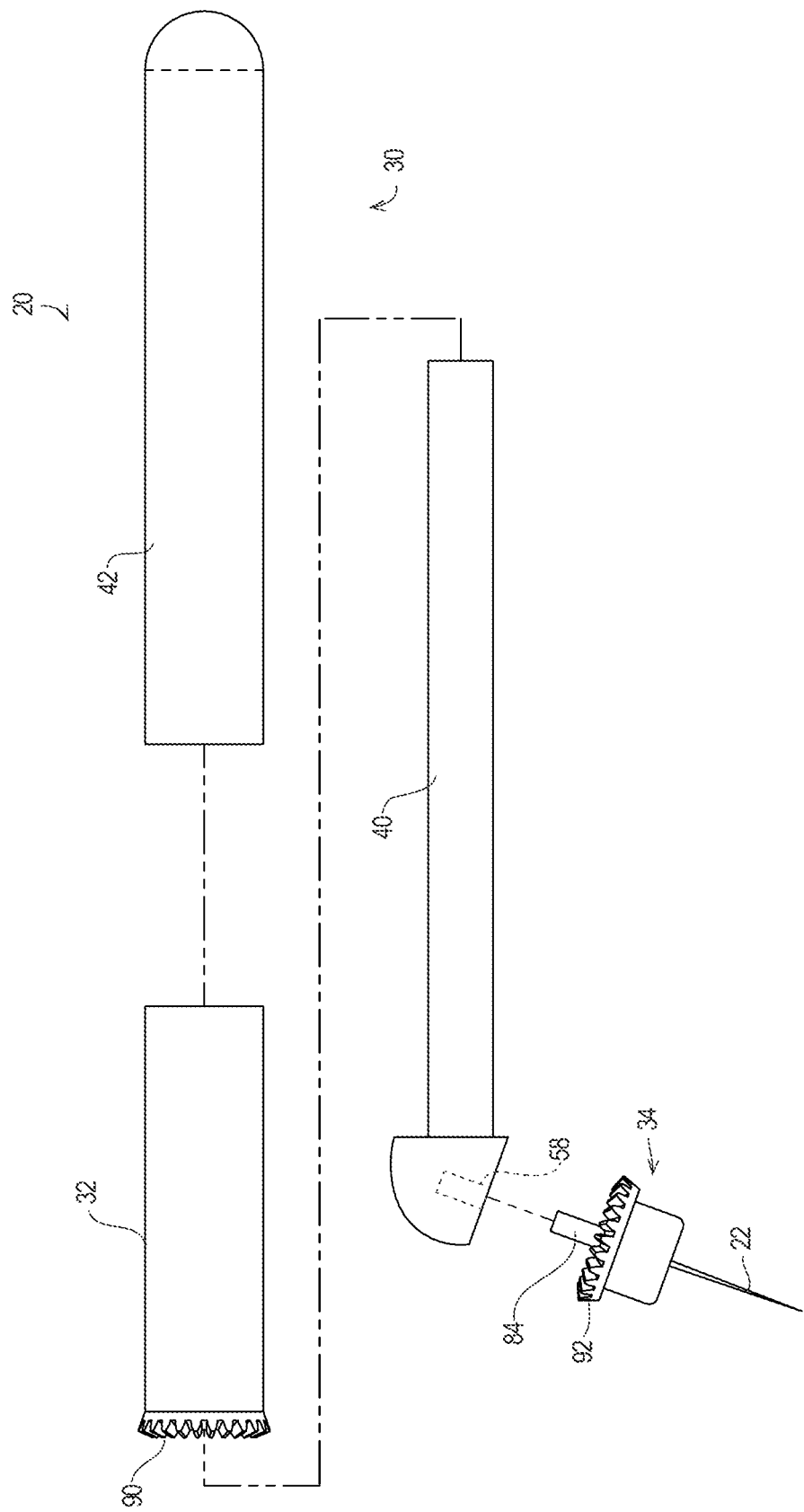
FIG. 1B is a side elevation exploded view of the first example handle system.

Referring initially to FIGS. 1A and 1B of the drawing, the present invention may be embodied as a first example handle system 20 for supporting an endodontic tool 22 such as a file (as shown in FIGS. 1A and 1B) or a reamer. The handle system 20 and tool 22 are of particular significance when used to prepare a tooth canal for cleaning, disinfecting, and filling during a root canal procedure, and the first example handle system 20 will be described herein in the context of performing a root canal procedure.

The first example handle system 20 additionally provides the user, typically but not necessarily a dentist, with improved hand grip when using small endodontic tools or instruments such as the example tool 22. The example handle system 20 further allows the user to manipulate the tool 22 with better access, more control and leverage, better visibility, and less fatigue. The first example handle system 20 defines a handle axis H, and the first example handle system 20 is configured such that the handle axis H extends at a first angle relative to a tool axis T defined by the tool 20. The first example handle system 20 allows the tool 22 to be simultaneously rotated about and displaced along the tool axis T defined by the tool 20 defined by the tool 22.

FIGS. 1A and 1B illustrate that the first example tool system 20 comprises a handle 30, a rotation sleeve 32, a head assembly 34, and a gear set 36.

As perhaps best shown in FIG. 1B, the example handle 30 comprises a first handle portion 40 and a second handle portion 42. The example first handle portion 40 defines a head portion 50, a sleeve support surface 52, and a first connection portion 54. A first stop portion 56 is formed between the sleeve support surface 52 and the first connection portion 54. An anchor portion 58 is formed in the head portion 50. The example second handle portion 42 defines a fixed surface 60 and second connection portion 62. A second stop portion 64 is formed by the second handle portion 42. The example first connection portion 54 is a threaded projection, and the example second connection portion 62 is a threaded cavity configured to receive the threaded projection defined by the first connection portion 54. When the threaded projection is fully threaded into the threaded cavity, the second stop portion 64 engages the first stop portion 56, and the second handle portion 42 is securely connected to the first handle portion 40. The first and second connecting portions 54 and 62 may be formed using other structures capable of securely connecting the second handle portion 42 to the first handle portion 40.

The example rotation sleeve 32 defines a sleeve outer surface 70, a sleeve inner surface 72, a sleeve first end 74, and a sleeve second end 76. The example sleeve support surface 52 and sleeve inner surface 72 are substantially cylindrical, and a diameter of the sleeve support surface 52 is slightly smaller than that of the sleeve inner surface 72. Further, a distance between the first stop portion 46 and the head portion 50 is slightly shorter than a distance between the sleeve first end 74 and the sleeve second end 76. With the first and second handle portion 40 and 42 disconnected, the rotation sleeve 32 may be arranged such that the rotation sleeve 32 is supported by the sleeve support surface 52. With the rotation sleeve 32 supported by the sleeve support surface 52, the first and second handle portions 40 and 42 may be connected to hold the rotation sleeve 32 in place on the sleeve support surface. Further, the dimensions of the rotation sleeve 32 are such that the rotation sleeve 32 may freely rotated relative to the example handle 30 when held in place as shown in FIG. 1A.

The example head assembly 34 comprises a rotation head 80 and a tool mounting system 82. The example rotation head 80 comprises a pin portion 84 configured to engage the anchor portion 58 of the head portion 50 such that the rotation head 80 is supported for rotation relative to the head portion 50. The example pin portion 84 may be a screw, and the example anchor portion 58 may be a threaded cavity adapted to receive the screw forming the pin portion 84. The example screw is sized and dimensioned relative to the rotation head and the threaded cavity to secure the rotation head 80 relative to the head portion 50 but allow rotation of the rotation head 80 relative to the head portion 50 and thus the handle 30. Other connections systems may be used to detachably attach the rotation head 80 to the head portion 50.

Figure 3:
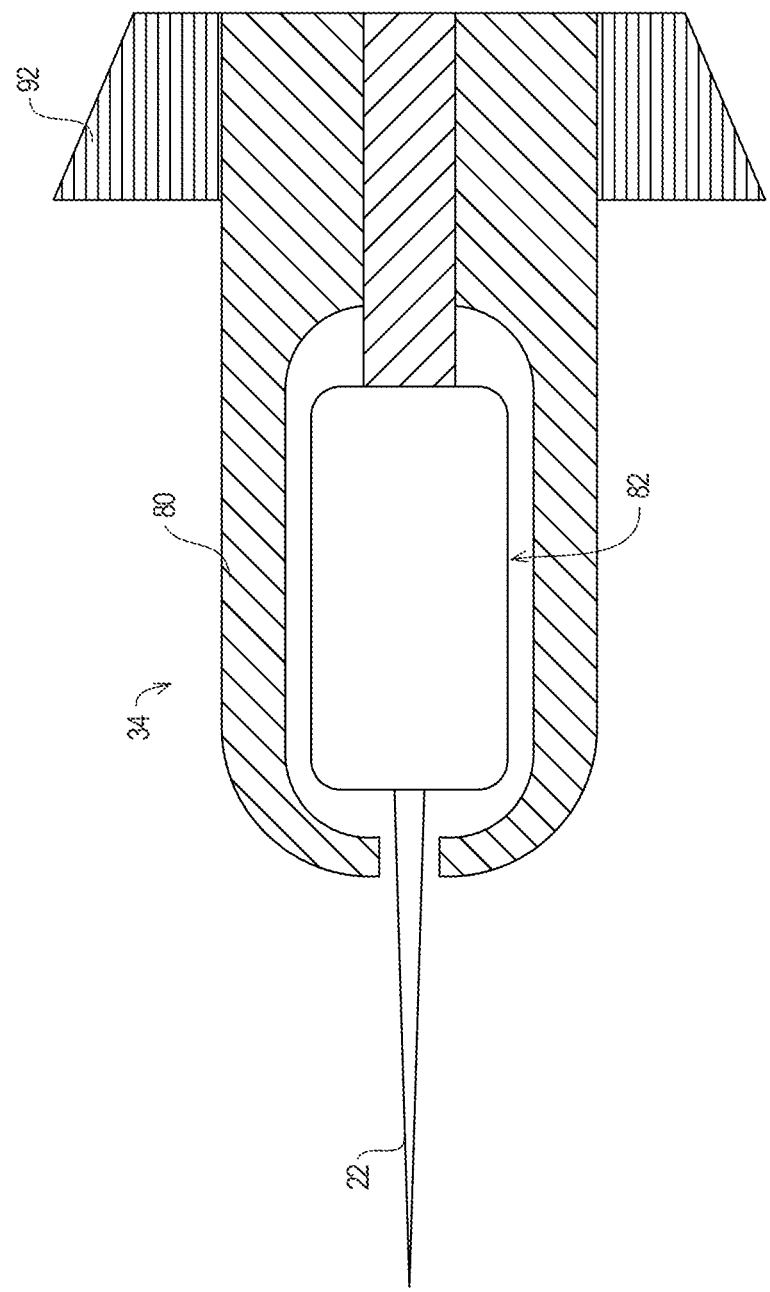
FIG. 3 is a side elevation, section view of an example locking chamber that may form a clamp system of an example handle system of the present invention.
Figure 4A:
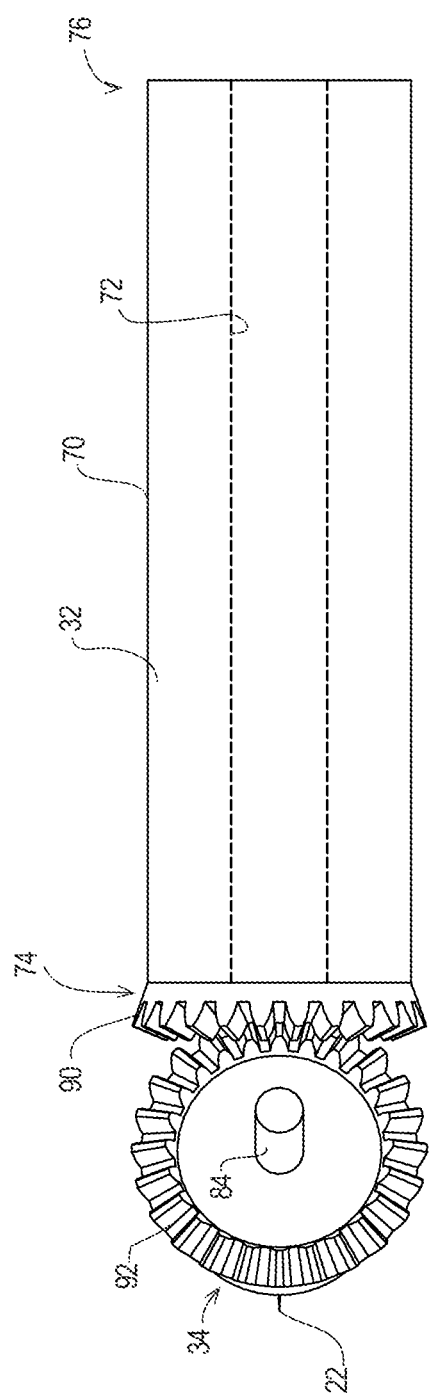

The example tool mounting system 82 is configured to grip the tool 22 and is supported by the rotation head 80 such that rotation of the rotation head 80 is transferred to the tool 22. FIG. 3 illustrates an example tool mounting system 82 may be formed by a drill chuck capable of gripping and releasing the example tool 22 to allow the tool 22 to be selectively attached to or detached from the first example handle system 20. FIG. 4 depicts an example locking chamber that may be used to form the example tool mounting system 82.

Figure 2:
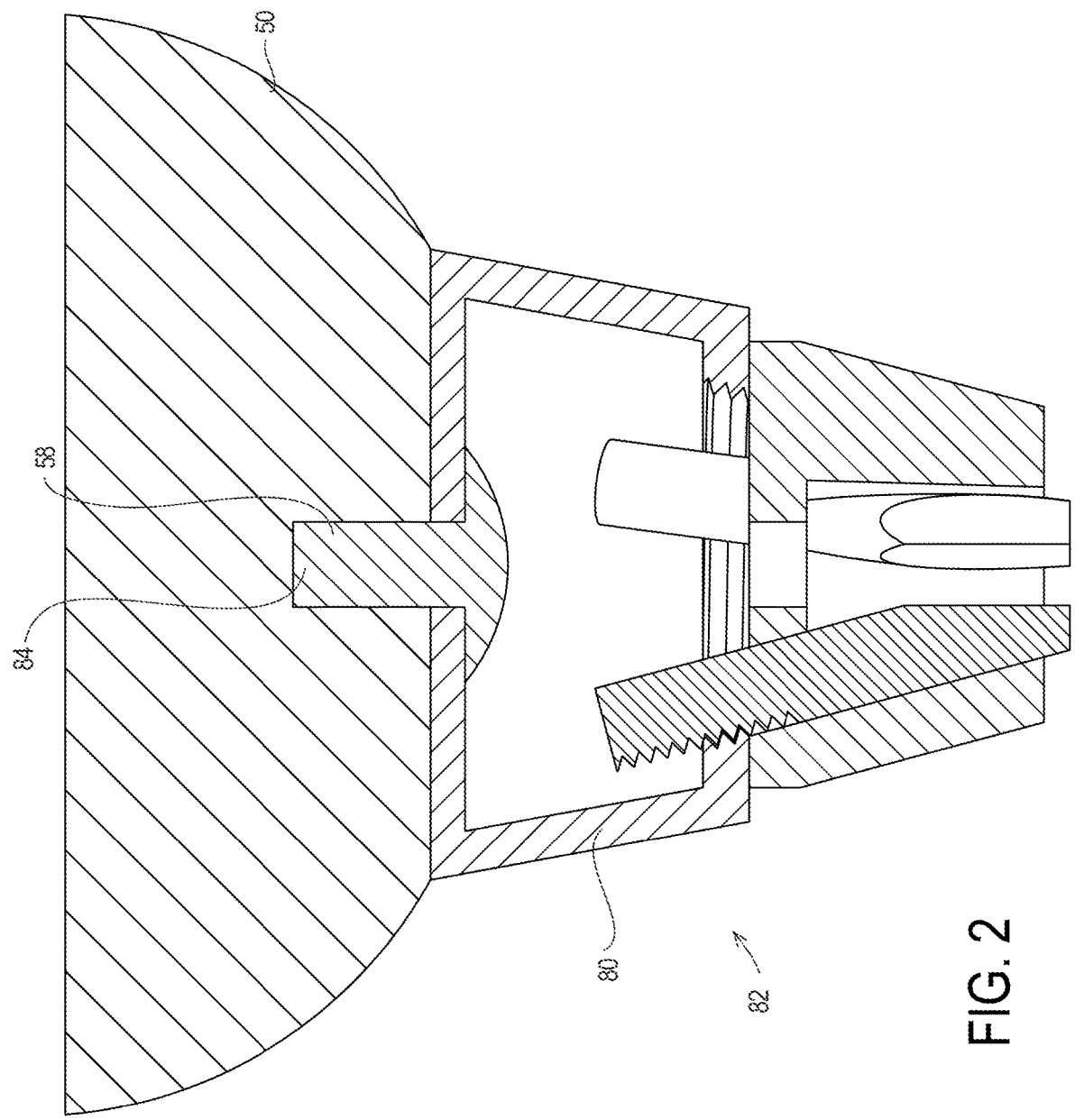
FIG. 2 is a side elevation, section view of an example drill chuck that may form a clamp system of an example handle system of the present invention.

As perhaps best shown in FIGS. 1B and 2 of the drawing, the example gear set 36 comprises a first gear portion 90 supported by the first end of the rotation sleeve 32 and a second gear portion 92 supported by the rotation head 80. When the first and second handle portions 40 and 42 are connected together such that the rotation sleeve 32 is held in place on the sleeve support surface 52, the first gear portion 90 engages the second gear portion 92 such that axial rotation of the rotation sleeve 32 about the handle axis H causes axial rotation of the tool 22 about the tool axis T defined by the tool 20. Further, the anchor portion 58, pin portion 84, first gear portion 90, and second gear portion are all angled such that the tool axis T defined by the tool 20 extends at the first angle relative to the handle axis H.

II. Second Example Handle System

Figure 5A:
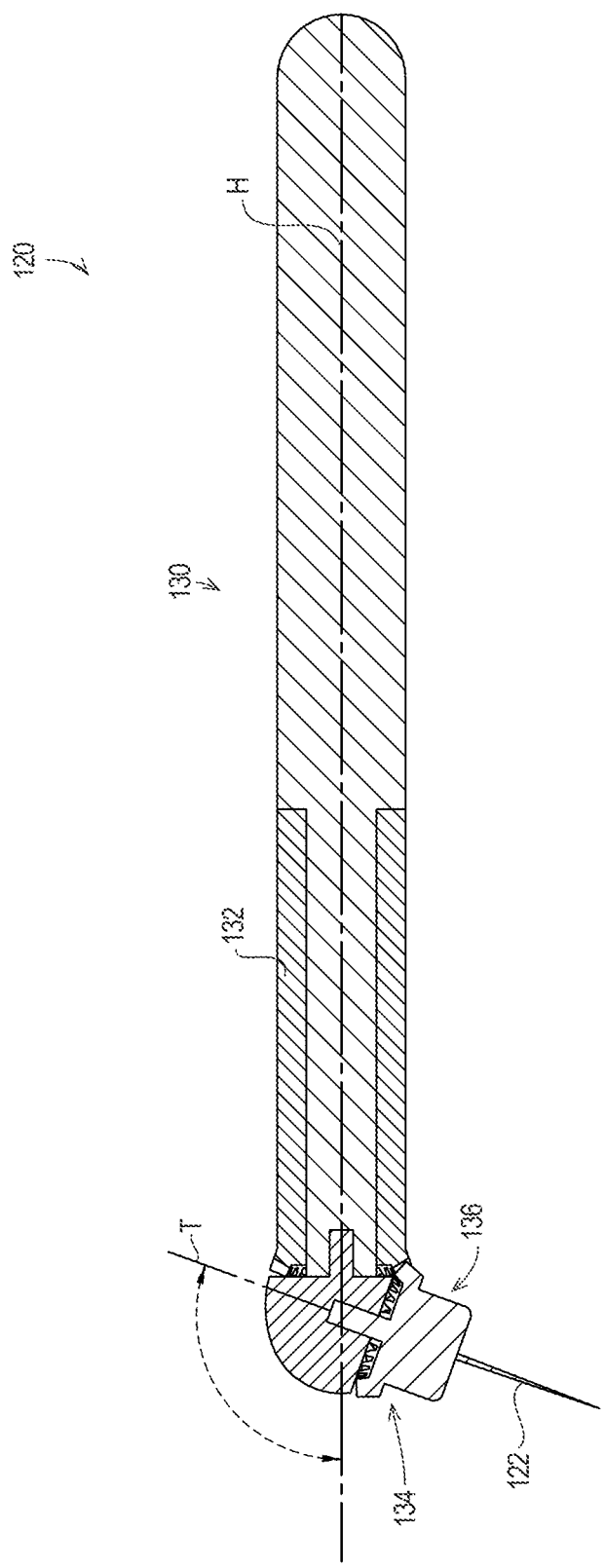
FIG. 5A is a side elevation, cutaway view of a second example handle system of the present invention.
Figure 5B:
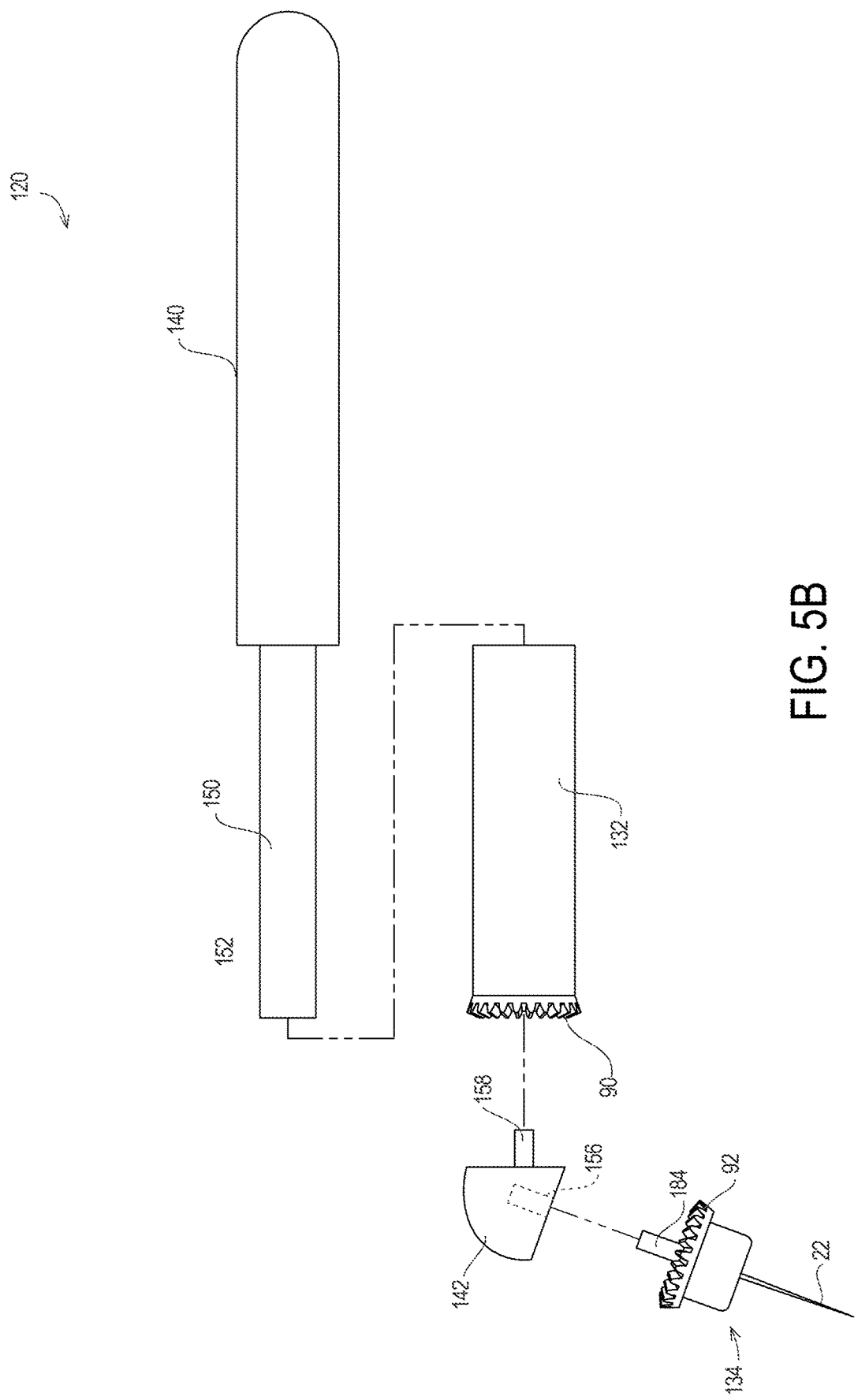
FIG. 5B is a side elevation exploded view of the second example handle system.

Referring now to FIGS. 5A and 5B of the drawing, the present invention may be embodied as a second example handle system 120 for supporting an endodontic tool 122 such as a file (as shown in FIGS. 5A and 5B) or a reamer. The handle system 120 and tool 122 are of particular significance when used to prepare a tooth canal for cleaning, disinfecting, and filling during a root canal procedure, and the second example handle system 120 will be described herein in the context of performing a root canal procedure.

The second example handle system 120 additionally provides the user, typically but not necessarily a dentist, with improved hand grip when using small endodontic tools or instruments such as the example tool 122. The example handle system 120 further allows the user to manipulate the tool 122 with better access, more control and leverage, better visibility, and less fatigue. The second example handle system 120 defines a handle axis H, and the second example handle system 120 is configured such that the handle axis H extends at a first angle relative to a tool axis T defined by the tool 120. The second example handle system 120 allows the tool 122 to be simultaneously rotated about and displaced along the tool axis T defined by the tool 122.

FIGS. 5A and 5B illustrate that the second example handle system 120 comprises a handle 130, a rotation sleeve 132, a head assembly 134, and a gear set 136.

As perhaps best shown in FIG. 1B, the example handle 130 comprises a main handle portion 140 and a head portion 142. The example main handle portion 140 defines a sleeve support surface 150, a first connection portion 152, and a step portion 154. An anchor portion 156 and a second connection portion 158 are defined by the head portion 142. The example first connection portion 152 is a threaded projection, and the example second connection portion 158 is a threaded cavity configured to receive the threaded projection defined by the first connection portion 152. When the threaded projection is fully threaded into the threaded cavity, head portion 142 is securely connected to the main handle portion 140. The first and second connecting portions 152 and 158 may be formed using other structures capable of securely connecting the head portion 142 to the main handle portion 140.

The example rotation sleeve 132 defines a sleeve outer surface 170, a sleeve inner surface 172, a sleeve first end 174, and a sleeve second end 176. The example sleeve support surface 150 and sleeve inner surface 172 are substantially cylindrical, and a diameter of the sleeve support surface 150 is slightly smaller than that of the sleeve inner surface 172. Further, a distance between the step portion 154 and the head portion 142 is slightly shorter than a distance between the sleeve first end 174 and the sleeve second end 176. With the head portion 142 disconnected from the main handle portion 140, the rotation sleeve 132 may be arranged such that the rotation sleeve 132 is supported by the sleeve support surface 150. With the rotation sleeve 132 supported by the sleeve support surface 150, the main handle portion 140 and head portion 142 may be connected to hold the rotation sleeve 132 in place on the sleeve support surface. Further, the dimensions of the rotation sleeve 132 are such that the rotation sleeve 132 may freely rotated relative to the example handle 130 when held in place as shown in FIG. 5A.

The example head assembly 134 comprises a rotation head 180 and a tool mounting system 182. The example rotation head 180 comprises a pin portion 184 configured to engage the anchor portion 158 of the head portion 142 such that the rotation head 180 is supported for rotation relative to the head portion 142. The example pin portion 184 may be a screw, and the example anchor portion 158 may be a threaded cavity adapted to receive the screw forming the pin portion 184. The example screw is sized and dimensioned relative to the rotation head and the threaded cavity to secure the rotation head 180 relative to the head portion 142 but allow rotation of the rotation head 180 relative to the head portion 142 and thus the handle 130. Other connections systems may be used to detachably attach the rotation head 180 to the head portion 142.

The example tool mounting system 182 is configured to grip the tool 122 and is supported by the rotation head 180 such that rotation of the rotation head 180 is transferred to the tool 122. FIG. 3 illustrates an example tool mounting system 182 may be formed by a drill chuck capable of gripping and releasing the example tool 122 to allow the tool 122 to be selectively attached to or detached from the second example handle system 120. FIG. 4 depicts an example locking chamber that may be used to form the example tool mounting system 182.

As perhaps best shown in FIGS. 5B and 2 of the drawing, the example gear set 136 comprises a first gear portion 190 supported by the first end of the rotation sleeve 132 and a second gear portion 192 supported by the rotation head 180. When the head portion 142 is connected to the main handle portion 140 such that the rotation sleeve 132 is held in place on the sleeve support surface 150, the first gear portion 190 engages the second gear portion 192 such that axial rotation of the rotation sleeve 132 about the handle axis H causes axial rotation of the tool 122 about the tool axis T defined by the tool 120. Further, the anchor portion 158, pin portion 184, first gear portion 190, and second gear portion are all angled such that the tool axis T defined by the tool 120 extends at the first angle relative to the handle axis H.

III. Third Example Handle System

Figure 6:
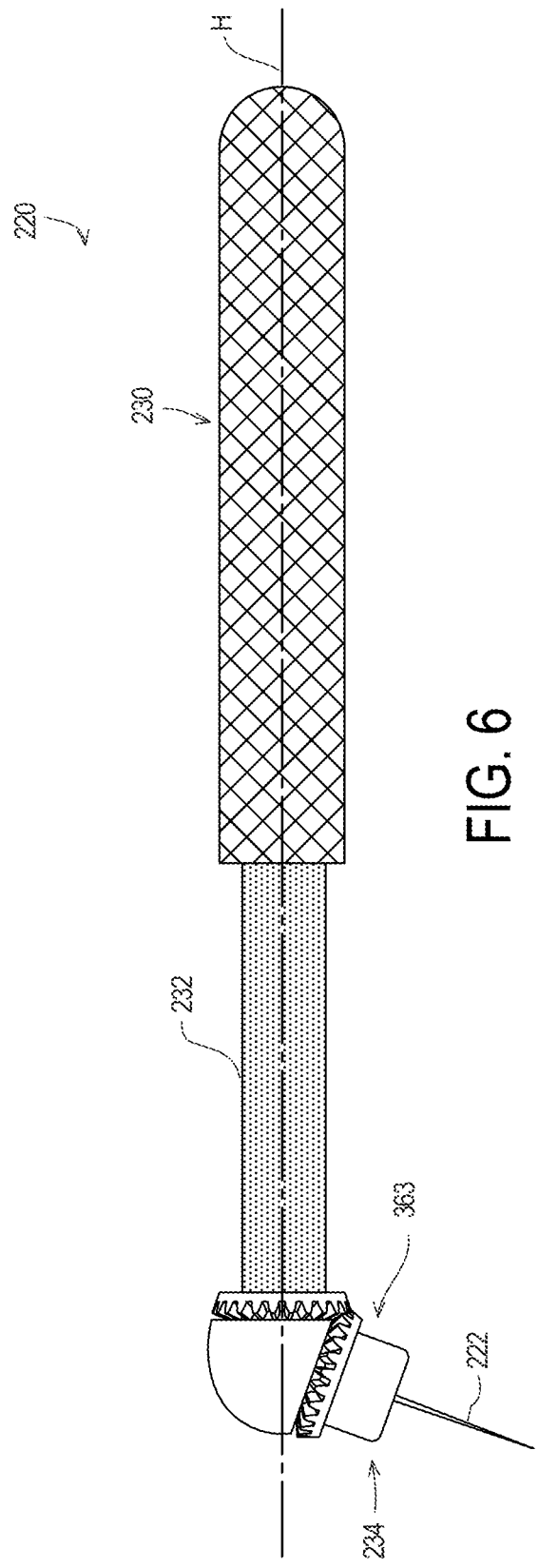
FIG. 6 is a side elevation view of a third example handle system of the present invention.

Referring now to FIG. 6 of the drawing, the present invention may be embodied as a third example handle system 220 for supporting an endodontic tool 222 such as a file (as shown in FIG. 6) or a reamer. The handle system 220 and tool 222 are of particular significance when used to prepare a tooth canal for cleaning, disinfecting, and filling during a root canal procedure, and the third example handle system 220 will be described herein in the context of performing a root canal procedure.

The third example handle system 220 additionally provides the user, typically but not necessarily a dentist, with improved hand grip when using small endodontic tools or instruments such as the example tool 222. The example handle system 220 further allows the user to manipulate the tool 222 with better access, more control and leverage, better visibility, and less fatigue. The third example handle system 220 defines a handle axis H, and the third example handle system 220 is configured such that the handle axis H extends at a first angle relative to a tool axis T defined by the tool 220. The third example handle system 220 allows the tool 222 to be simultaneously rotated about and displaced along the tool axis T defined by the tool 222.

The third example tool system 220 comprises a handle 230, a rotation sleeve 232, a head assembly 234, and a gear set 236. The third example 220 is or may be constructed, assembled, and used in a manner that is similar to the first example tool system 20 or the second example tool system 120 described above except that, as depicted in FIG. 6, an outer diameter of the rotation sleeve 232 is reduced in comparison to an exposed outer diameter of the handle 230. Different texturing may also be applied to the outer surfaces of the handle 230 and/or rotation sleeve 232 to facilitate manipulation of the handle 230 and/or tool 222.

IV. Fourth Example Handle System

Figure 7:
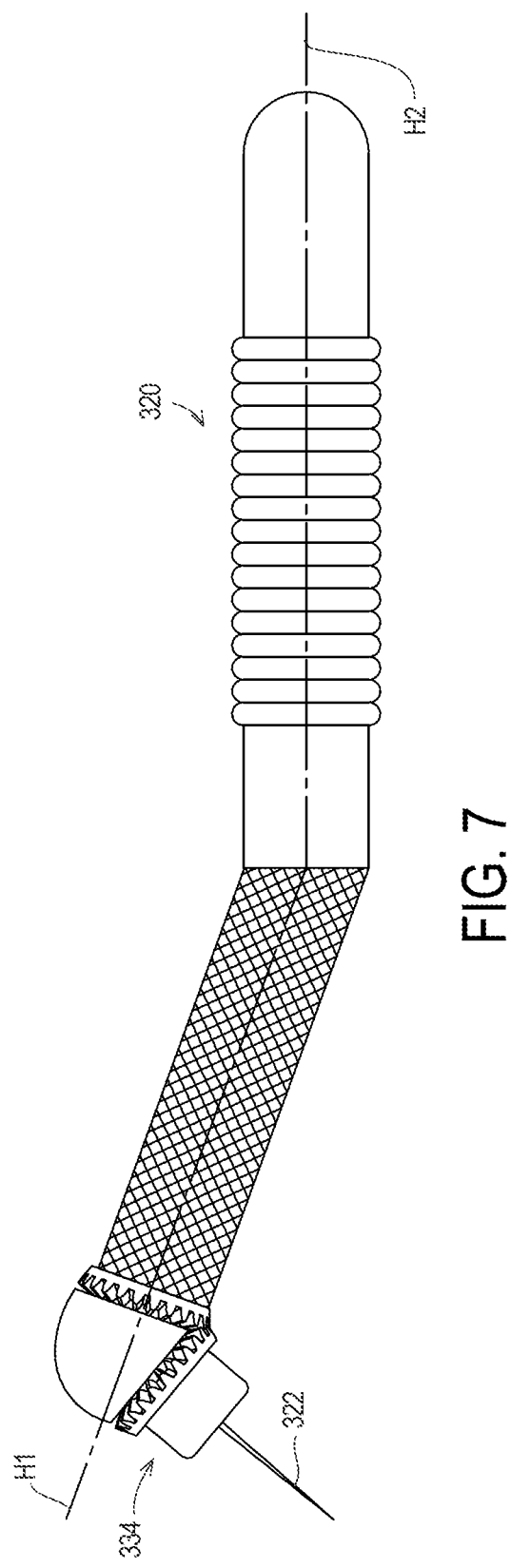
FIG. 7 is a side elevation view of a fourth example handle system of the present invention.

Referring now to FIG. 7 of the drawing, the present invention may be embodied as a fourth example handle system 320 for supporting an endodontic tool 322 such as a file (as shown in FIG. 7) or a reamer. The handle system 320 and tool 322 are of particular significance when used to prepare a tooth canal for cleaning, disinfecting, and filling during a root canal procedure, and the fourth example handle system 320 will be described herein in the context of performing a root canal procedure.

The fourth example handle system 320 additionally provides the user, typically but not necessarily a dentist, with improved hand grip when using small endodontic tools or instruments such as the example tool 322. The example handle system 320 further allows the user to manipulate the tool 322 with better access, more control and leverage, better visibility, and less fatigue. The fourth example handle system 320 defines a handle axis H, and the fourth example handle system 320 is configured such that the handle axis H extends at a first angle relative to a tool axis T defined by the tool 320. The fourth example handle system 320 allows the tool 322 to be simultaneously rotated about and displaced along the tool axis T defined by the tool 322.

The fourth example tool system 320 comprises a handle 330, a rotation sleeve 332, a head assembly 334, and a gear set 336. The fourth example 320 is or may be constructed, assembled, and used in a manner that is similar to the first and second example tool system 120 described above except that, as depicted in FIG. 7, the handle 330 defines first and second handle axes H1 and H2. The first and second handle axes H1 and H2 are offset from each other by a second angle. Different texturing and/or surface shapes may also be applied to or formed on the outer surfaces of the handle 330 and/or rotation sleeve 332 to facilitate manipulation of the handle 330 and/or tool 322.

V. Additional Considerations

The first angle between angle H of the handle and tool angle T of the tool can be design in 0-180 degree. In another embodiment, the first angle between the handle and the tool can be adjustable according to clinical use. For example, different head portions and gear sets may be used to obtain different first angles. By comparing to directly use an endodontic file manually, the smart handle in present invention can increase rotation force, rotation speed, and reciprocation force.

As described and depicted above, the example rotation sleeve or sleeve roller of any of the embodiments of the present invention includes, but are not limited a hollow cylinder, tube, wheel, or hollow prims with gear in one end as illustrated in FIG. 4 of the drawing. The example rotation sleeve or sleeve roller with the gear on outside handle holder can easily rotated manually by using the hand fingers. The first and second gear portions engage each other to transmit the rotation power from rotation sleeve or sleeve roller to the rotation head to drive the tool in rotation.

The length of the example rotation sleeve or gear sleeve roller of any embodiments of the present invention may be in the range 1 mm-200 mm but is preferably in the range 2 mm-100 mm. The outside diameter of the rotation sleeve or sleeve roller of any of the examples of the present invention is typically in the range 2 mm-70 mm but is preferably in range 3 mm-50 mm. The inside diameter of the rotation sleeve or gear sleeve roller of any examples of the present invention is typically in the range 0.5 mm-60 mm but is preferably in the range of 1 mm-49 mm.

The rotation head of the examples of the present invention comprises at least one clamp/or chuck to hold endodontic file firmly to be rotated and/or reciprocated relative to root canal and at least one gear to receive the rotation power from the sleeve roller to allow simultaneous driving of the endodontic file in axial rotation. The rotation head is connected to handle holder firmly and rotated easily. In one embodiment, the rotation gears could be used as rotation connector between rotation handle holder and rotation head. In one embodiment, the rotation head can be connected to handle holder by screw. However, if the smart handle is made by 3D printing process, the screw is not necessary to connect the rotation head with holder or handle.

The angle between the endodontic tool and the handle holder of any of the embodiments of the present invention can be designed in the range of 0-180 degrees according to clinical requirement. In one embodiment, the angle of between tool and handle holder is adjustable during to the clinical use in the range of 0-180 degree. Preferably, the first angle between the tool and the handle is in a second range of 90 to 120 degrees.

In general, dentists manually rotate endodontic tool and do axial reciprocation simultaneously. However, the endodontic file handle is very small and is very difficult hold directly by hand. To increase rotation force, the ratio of diameter of endodontic file handle to diameter of the rotation sleeve roller may be increased.

In present invention, a universal clamp is used to hold the endodontic tools. Example universal clamps that may be used include, but are not limited to, a drill chuck, a locking chamber, or tube clamps.

The materials for making the smart handles of endodontic files in present invention include, but not limited to, metals, alloys, plastics, polymer, copolymer, resin ceramics, composite, and mixtures thereof. The metals and alloys in present invention for making the smart handles include, but not limited to, Titanium, Vanadium, Chromium, Manganese, Iron, steel, Cobalt, Nickel, Copper, Zinc, Silver, Tantalum, Tungsten, Platinum, Gold, and mixture thereof. The plastics and polymer in present invention for making the smart handles include, but not limited to, thermoplastics or thermosetting polymers, such as: polyethylene (PE), polypropylene (PP), polystyrene (PS) and polyvinyl chloride (PVC), Polyamides (PA) or (nylons), Polycarbonate (PC), High-density polyethylene (HDPE), Low-density polyethylene (LDPE), Polyethylene terephthalate (PET), High impact polystyrene (HIPS), Polyurethanes (PU), Polyvinyl chloride (PVC), Acrylonitrile butadiene styrene (ABS), Polycarbonate+Acrylonitrile Butadiene Styrene (PC+ABS), Polyethylene+Acrylonitrile Butadiene Styrene (PE+ABS), and mixture thereof. Amorphous plastics and crystalline plastics that may be used to form examples of the present invention include but not limited to polyethylene, polypropylene, polyvinyl chloride, polyamides (nylons), polyesters and some polyurethanes.

The smart handles in present invention are made by using various method and process, include but not limited to, machining, injection molding, heat pressing, 3D printing, and mixture thereof.

The present invention provides the increase the file rotation force by increasing ratio of diameter of the sleeve roller to the endodontic files. Also, the endodontic file can be moved up and/or down for the axial reciprocation of root canal easily.

The present invention thus provides a tool capable of both rotary and axial reciprocation. In any example embodiment of the invention as described herein, the parameters of the tool may be set as desired to coordinate axial and rotary reciprocation to achieve the best results in a particular procedure. It will be appreciated that not every advantage referred to herein applies to every embodiment of the invention.

The present invention provides some descriptions and drawings to explain the invention concept, making, and applications, however, it is to be understood that the invention is not limited in its application to the descriptions and drawings of construction or to the arrangements of the components set forth in the following descriptions or illustrated in the drawings. The invention is capable of other embodiments and of being practiced and carried out in various ways. Also, it is to be understood that the phraseology and terminology employed herein are for the purpose of the description and should not be regarded as limiting.

What is claimed is:

1. A handle system for supporting a tool defining a tool axis during the performance of dental procedures comprising:
    a handle defining a handle axis;
    a rotation sleeve;
    a head assembly; and
    a gear set comprising first and second gear portions; wherein
    the rotation sleeve supports the first gear portion;
    the head assembly supports the second gear portion;
    the handle supports the rotation sleeve for rotation relative to the handle;
    the handle supports the head assembly such that the first gear portion engages the second gear portion; and with the head assembly supported by the handle,
the head assembly engages the tool to support the tool such that the tool axis extends at a first angle relative to the handle axis, and
rotation of the rotation sleeve relative to the handle causes axial rotation of the tool about the tool axis.

2. A handle system as recited in claim 1, in which the handle comprises a first handle portion and a second handle portion, where the first handle portion engages the second handle portion to limit movement of the rotation sleeve relative to the handle.

3. A handle system as recited in claim 2, in which:
the first handle portion defines an anchor portion; and
the head assembly comprises a pin portion; wherein
the pin portion engages the anchor portion to allow the head assembly to rotate relative to the handle.

4. A handle system as recited in claim 1, in which the handle comprises:
a first handle portion defining a head portion; and
a second handle portion defining a stop portion; wherein
the rotation sleeve is arranged between the head portion and the stop portion to limit movement of the rotation sleeve relative to the handle.

5. A handle system as recited in claim 1, in which the handle comprises:
a first handle portion defining a first connecting portion; and
a second handle portion defining a second connecting portion; wherein
the first connecting portion engages the second connecting portion to detachably attach the first handle portion and the second handle portion.

6. A handle system as recited in claim 1, in which the handle comprises a main handle portion and a head portion, where the main handle portion engages the head portion to limit movement of the rotation sleeve relative to the handle.

7. A handle system as recited in claim 6, in which:
the head portion defines an anchor portion; and
the head assembly comprises a pin portion; wherein
the pin portion engages the anchor portion to allow the head assembly to rotate relative to the handle.

8. A handle system as recited in claim 1, in which the handle comprises:
a main handle portion defining a step portion; and
a head portion; wherein
the rotation sleeve is arranged between the step portion and the head portion to limit movement of the rotation sleeve relative to the handle.

9. A handle system as recited in claim 1, in which the handle comprises:
a main handle portion defining a first connecting portion; and
a head portion defining a second connecting portion; wherein
the first connecting portion engages the second connecting portion to detachably attach the main handle portion and the head portion.

10. A handle system as recited in claim 1, in which:
the handle defines an anchor portion; and
the head assembly comprises a pin portion; wherein
the pin portion engages the anchor portion to allow the head assembly to rotate relative to the handle.

11. A handle system as recited in claim 1, in which the head assembly comprises a tool mounting system for securing the tool relative to the head assembly.

12. A handle system as recited in claim 11, in which the tool mounting system comprises a chuck system that clamps the tool to secure the tool relative to the head assembly.

13. A handle system as recited in claim 11, in which the tool mounting system comprises a locking chamber system that secures the tool relative to the head assembly.

14. A handle system for supporting a tool defining a tool axis during the performance of dental procedures comprising:
a handle defining a handle axis and comprising
a first handle portion defining a first connection portion, and
a second handle portion defining a second connection portion, where
the first connection portion engages the second connection portion to detachably attach the first handle portion to the second handle portion;
a rotation sleeve comprising a first gear portion;
a head assembly comprising
a tool mounting system, and
a second gear portion; wherein
the handle supports
the rotation sleeve for rotation relative to the handle, and
the head assembly such that the first gear portion engages the second gear portion; and
with the head assembly supported by the handle,
the head assembly engages the tool to support the tool such that the tool axis extends at a first angle relative to the handle axis, and
rotation of the rotation sleeve relative to the handle causes axial rotation of the tool about the tool axis.

15. A handle system as recited in claim 14, in which:
the handle defines an anchor portion; and
the head assembly comprises a pin portion; wherein
the pin portion engages the anchor portion to allow the head assembly to rotate relative to the handle.

16. A handle system as recited in claim 14, in which the tool mounting system comprises a chuck system that clamps the tool to secure the tool relative to the head assembly.

17. A handle system as recited in claim 14, in which the tool mounting system comprises a locking chamber system that secures the tool relative to the head assembly.

18. A method of supporting a tool defining a tool axis during the performance of dental procedures comprising the steps of:
providing a handle defining a handle axis;
providing a rotation sleeve;
providing a head assembly; and
supporting a first gear portion on the rotation sleeve;
supporting a second gear set on the head assembly;
supporting the rotation sleeve on the handle such that the rotation sleeve may rotate relative to the handle;
supporting the head assembly on the handle such that the first gear portion engages the second gear portion;
operating the head assembly to engage the tool to support the tool such that the tool axis extends at a first angle relative to the handle axis; and
rotating the rotation sleeve relative to the handle to cause axial rotation of the tool about the tool axis.

19. A method as recited in claim 18, in which:
the step of providing the handle comprises the step of forming the handle to define an anchor portion;
the step of providing the head assembly comprises the step of forming the head assembly to define a pin portion; and causing the pin portion to engage the anchor portion to allow the head assembly to rotate relative to the handle.

20. A method as recited in claim 18, in which the step of providing the head assembly comprises the step of providing a tool mounting system for securing the tool relative to the head assembly.

\* \* \* \* \*